United States Patent
Trim et al.

(10) Patent No.: US 10,789,296 B2
(45) Date of Patent: Sep. 29, 2020

(54) DETECTION OF MISSING ENTITIES IN A GRAPH SCHEMA

(71) Applicant: International Business Machines Corporation, Armonk, NY (US)

(72) Inventors: Craig M. Trim, Ventura, CA (US); Charles E. Beller, Baltimore, MD (US); Shaila Pervin, Docklands (AU); Cesar Augusto Rodriguez Bravo, Alajuela (CR)

(73) Assignee: International Business Machines Corporation, Armonk, NY (US)

( * ) Notice: Subject to any disclaimer, the term of this patent is extended or adjusted under 35 U.S.C. 154(b) by 128 days.

(21) Appl. No.: 16/031,811

(22) Filed: Jul. 10, 2018

(65) Prior Publication Data
US 2020/0019647 A1    Jan. 16, 2020

(51) Int. Cl.
*G06F 15/16* (2006.01)
*G06F 16/901* (2019.01)
*G06K 9/62* (2006.01)
*G06N 20/00* (2019.01)
*G06F 16/21* (2019.01)

(52) U.S. Cl.
CPC ........ *G06F 16/9024* (2019.01); *G06F 16/212* (2019.01); *G06K 9/6223* (2013.01); *G06N 20/00* (2019.01)

(58) Field of Classification Search
CPC ... G06F 16/9024; G06F 16/212; G06N 20/00; G06K 9/6223; G06K 9/6265
See application file for complete search history.

(56) References Cited

U.S. PATENT DOCUMENTS

| | | | |
|---|---|---|---|
| 9,613,070 B2 | 4/2017 | Kumar et al. | |
| 9,710,496 B2 | 7/2017 | Arenas et al. | |
| 2008/0243770 A1* | 10/2008 | Aasman | G06F 16/28 |
| 2014/0280008 A1 | 9/2014 | Boudreau et al. | |
| 2016/0042049 A1* | 2/2016 | Shilts | G06Q 10/04 707/603 |
| 2016/0357747 A1 | 12/2016 | Parthasarathy et al. | |

(Continued)

OTHER PUBLICATIONS

Jain, A. Data clustering: 50 years beyond K-means. Pattern Recognition Letters 31 (2010), pp. 651-666. (Year: 2010).*

(Continued)

*Primary Examiner* — Alex Gofman
*Assistant Examiner* — Shelly X Qian
(74) *Attorney, Agent, or Firm* — Yee & Associates, P.C.

(57) ABSTRACT

Detecting missing entities in a graph schema is provided. Unlabeled and unstructured data of a particular domain are divided into a plurality of Voronoi cells using a clustering algorithm that is initiated with cluster centroids proportional to a number of entity types corresponding to the particular domain existing in the graph schema. One additional cluster more than the number of entity types corresponding to the particular domain existing in the graph schema is initialized using a cluster initializing formula of the clustering algorithm. It is determined whether the one additional cluster is populated. In response to determining that the one additional cluster is populated, an entity type is determined to be missing from the number of entity types existing in the graph schema. The missing entity type is added to the graph schema.

19 Claims, 3 Drawing Sheets

(56) References Cited

U.S. PATENT DOCUMENTS

2017/0032249 A1 2/2017 Chougule et al.
2017/0124217 A1 5/2017 Hassanzadeh et al.
2018/0032603 A1 2/2018 Gonzalez et al.

OTHER PUBLICATIONS

Jiang, et al. Two-phase clustering process for outliers detection. Pattern Recognition Letters 22 (2001), pp. 691-700. (Year: 2001).*
Neelakantan et al., "Inferring Missing Entity Type Instances for Knowledge Base Completion: New Dataset and Methods," arXiv preprint arXiv:1504.06658 (2015). Retrieved from Internet using: https://arxiv.org/pdf/1504.06658.
Paulheim, "Knowledge Graph Refinement: A Survey of Approaches and Evaluation Methods," Semantic Web 0, No. 3 (2017): pp. 489-508.
Wan et al., "An Approach of Entity Alignment Based on Semantic Features," 2017 4th International Conference on Information, Cybernetics and Computational Social Systems (ICCSS), 2017, pp. 170-174.
Moon et al., "Learning Entity Type Embeddings for Knowledge Graph Completion," CIKM '17 Proceedings of the 2017 ACM Conference on Information and Knowledge Management, Nov. 2017, Singapore, pp. 2215-2218.
Lin et al., "Learning Relational Bayesian Classifiers from RDF Data," Proceedings of the 10th International Conference on the Semantic Web, Oct. 23-27, 2011, Bonn, Germany, 16 pages.

\* cited by examiner

DETECTION OF MISSING ENTITIES IN A GRAPH SCHEMA

BACKGROUND

1. Field

The disclosure relates generally to graph databases and more specifically to detecting missing entities in a graph schema of a graph database and automatically adding the detected missing entities to the graph schema.

2. Description of the Related Art

Structured data refer to data that are of a determined length or structure and that reside in a fixed field or record. Credit card numbers, social security numbers, and telephone numbers are but a few examples of structured data. Structured data generally resides in a relational database in a table format.

Unstructured data are information that either does not have a pre-defined data model or is not organized in a pre-defined manner. Unstructured data are typically in the form of textual information, but may contain dates and numbers as well. This results in irregularities and ambiguities that make unstructured data difficult to understand using traditional programs as compared to data stored in rows and columns in a traditional relational database. Examples of unstructured data may include books, journals, technical specifications, training manuals, product catalogs, web pages, blogs, social media posts, documents, metadata, records, audio files, video files, images, graphics, emails, text messages, and the like. Increasingly, unstructured data is becoming more prevalent in IT systems and is used by enterprises and organizations in a variety of business intelligence and data analytics applications. Data mining and machine learning, such as natural language processing and text analytics, provide different techniques to find patterns in, or otherwise interpret, this unstructured information. Unstructured data typically resides in a graph database.

A graph database is a database that uses graph structures for semantic queries with nodes, edges, and properties to represent and store data. Nodes in the graph database represent entities, such as, for example, people, businesses, accounts, products, objects, or any other item you might want to keep track of. Properties are pertinent information that relate to nodes. Edges represent the relationships that connect nodes to nodes or nodes to properties. The edges may be directed from one node to another or undirected with no specific from-to relationship between a pair of nodes.

The graph database stores the unstructured data according to a graph schema. The graph schema represents a logical configuration of the graph database. Thus, the graph schema indicates how entities that make up the graph database relate to one another. In other words, at a most basic level, the graph schema indicates which data make up the graph database.

Retrieving data from the graph database requires a query language, such as, for example, SPARQL (SPARQL Protocol and RDF Query Language). SPARQL is a Resource Description Framework (RDF) query language, which is a semantic query language for graph databases, able to retrieve and manipulate data stored in an RDF format.

In today's IT environment, professionals are faced with management of vast amounts of data (e.g., Big Data). Choices have to made with respect to modeling and storing this data. The use of a relational database may indicate that the relationships and entities within the data are of a relatively static disposition and are well understood by the domain experts. The use of a graph database may indicate that the domain of knowledge is too large to understand completely, and too dynamic (e.g., changing constantly or within short intervals of time) to model in a relational paradigm, where schema changes can have a severe impact on dependent applications.

SUMMARY

According to one illustrative embodiment, a computer-implemented method for detecting missing entities in a graph schema is provided. Unlabeled and unstructured data of a particular domain are divided into a plurality of Voronoi cells using a clustering algorithm that is initiated with cluster centroids proportional to a number of entity types corresponding to the particular domain existing in the graph schema. One additional cluster more than the number of entity types corresponding to the particular domain existing in the graph schema is initialized using a cluster initializing formula of the clustering algorithm. It is determined whether the one additional cluster is populated. In response to determining that the one additional cluster is populated, an entity type is determined to be missing from the number of entity types existing in the graph schema and the missing entity type is added to the graph schema. In response to determining that the one additional cluster is not populated, all entity types of the particular domain are determined to exist in the graph schema.

In addition, the number of entity types existing in the graph schema is incremented by one accounting for the added missing entity type. The clustering algorithm is then re-executed initiating a number of cluster centroids proportional to the incremented number of entity types. A number of clusters corresponding to the incremented number of entity types are populated and a determination is made as to whether a cluster in the number of clusters is not populated. In response to determining that the number of clusters is populated, another entity type is determined to be missing from the graph schema. In response to determining that a cluster in the number of clusters is not populated, all entity types of the particular domain are determined to exist in the graph schema. Further, the graph schema having all entity types corresponding to the particular domain modeled in the graph schema is outputted to a graph database server hosting a graph database that complies with the graph schema to increase query performance and efficiency of the graph database server. Also, a notification regarding the missing entity type is sent.

According to other illustrative embodiments, a computer system and computer program product for detecting missing entities in a graph schema are provided.

DETAILED DESCRIPTION

Figure 1:
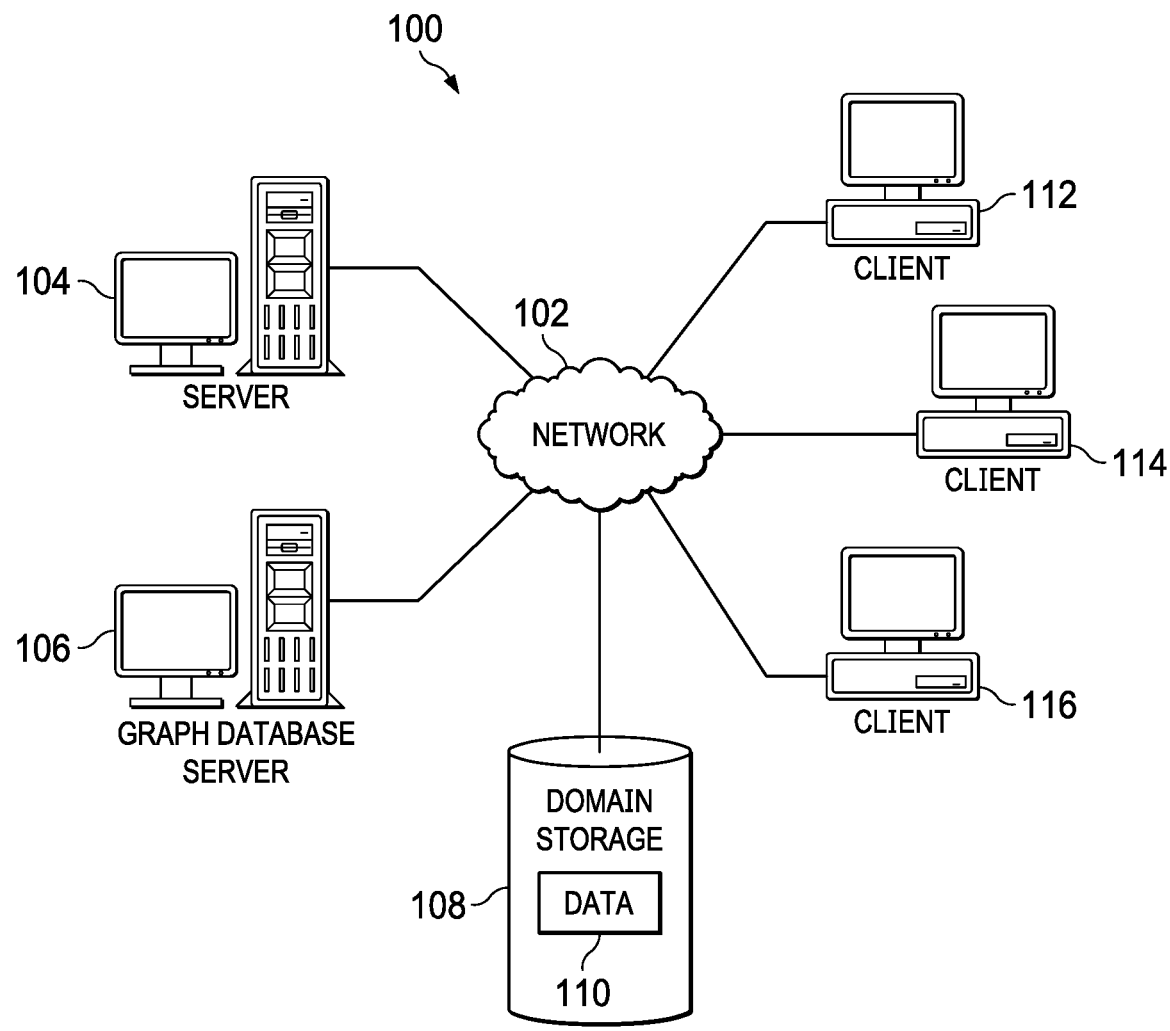
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
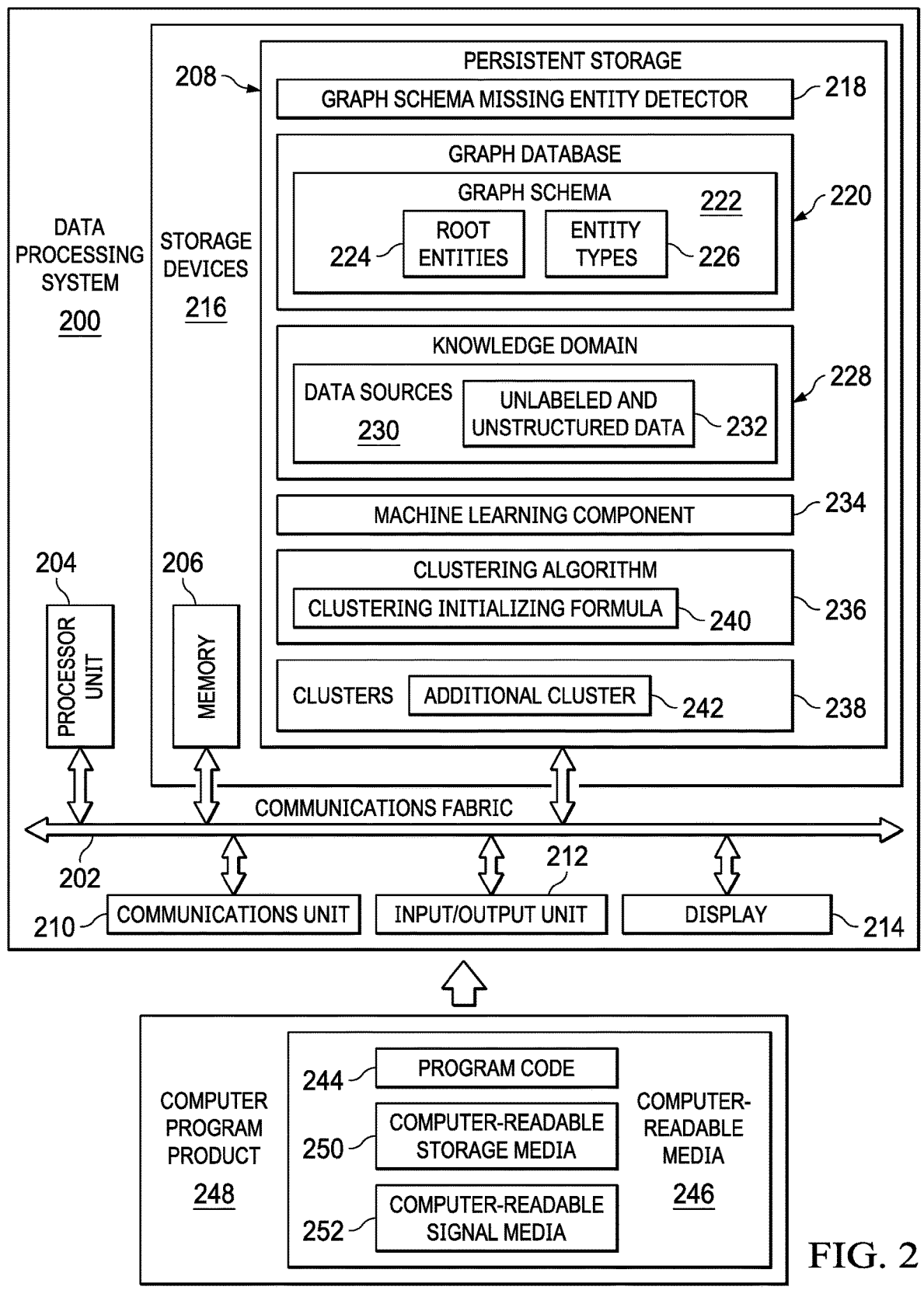
FIG. 2 is a diagram of a data processing system in which illustrative embodiments may be implemented.

With reference now to the figures, and in particular, with reference to FIG. 1 and FIG. 2, diagrams of data processing environments are provided in which illustrative embodiments may be implemented. It should be appreciated that FIG. 1 and FIG. 2 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104 and server 106 connect to network 102, along with domain storage 108. Server 104 and server 106 may be, for example, server computers with high-speed connections to network 102. In addition, it should be noted that server 104 and server 106 may each represent clusters of servers in one or more data centers. Alternatively, server 104 and server 106 may each represent multiple computing nodes in a cloud environment.

Also in the depicted example, server 104 is a computer that analyzes a graph schema corresponding to a graph database hosted by graph database server 106 in order to detect missing entity types, which correspond to a particular knowledge domain, within the graph schema. Server 104 ingests and analyzes data 110 of domain storage 108. Data 110 may be, for example, unlabeled and unstructured data corresponding to a particular domain, such as an oil industry domain, an insurance industry domain, a product manufacturing domain, an education domain, a healthcare domain, an automotive domain, a government domain, a food service domain, a legal domain, or the like. However, it should be noted that data 110 also may include structured data as well. Server 104 analyzes ingested data 110 using, for example, machine learning. Machine learning is a subset of artificial intelligence that uses statistical techniques to give server 104 the ability to learn from ingested data 110 without being explicitly programmed to do so.

Based on the analysis, server 104, using a clustering algorithm, divides ingested data 100 into a plurality of clusters and adds one additional cluster. Each of the plurality of clusters corresponds to an existing entity in the graph schema. If server 104 detects that the additional cluster is populated with data, then server 104 determines that an entity type is missing from the graph schema corresponding to the graph database of graph database server 106. Server 104 then adds the missing entity type to the graph schema. By ensuring that the graph schema is updated and complete and that the graph database of graph database server 106 complies with the updated graph schema, server 104 is able to increase the query performance and efficiency of graph database server 106.

Domain storage 108 represents a network storage device capable of storing any type of domain information in an unstructured and a structured format. In addition, domain storage 108 may represent a plurality of different local and/or remote network storage devices that store information for a set of one or more knowledge domains. Further, domain storage 108 may store other types of information, such as authentication or credential data that may include user names, passwords, and biometric data associated with domain subject matter experts or system administrators, for example.

Client 112, client 114, and client 116 also connect to network 102. Clients 112, 114, and 116 are clients of graph database server 106. In this example, clients 112, 114, and 116 are shown as desktop or personal computers with wire communication links to network 102. However, it should be noted that clients 112, 114, and 116 are examples only and may represent other types of data processing systems, such as, for example, network computers, laptop computers, handheld computers, smart phones, smart watches, smart televisions, kiosks, and the like. Users of clients 112, 114, and 116 may utilize clients 112, 114, and 116 to submit data queries requesting domain information from graph database server 106.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to graph database server 106 over network 102 for use on graph database server 106.

In the depicted example, network data processing system 100 may be implemented as a number of different types of communication networks, such as, for example, an internet, an intranet, a local area network (LAN), a wide area network (WAN), or any combination thereof. FIG. 1 is intended as an example only, and not as an architectural limitation for the different illustrative embodiments.

With reference now to FIG. 2, a diagram of a data processing system is depicted in accordance with an illustrative embodiment. Data processing system 200 is an example of a computer, such as server 104 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-processor core, depending on the particular implementation.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random-access memory (RAM), or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores graph schema missing entity detector 218. However, it should be noted that even though graph schema missing entity detector 218 is illustrated as residing in persistent storage 208, in an alternative illustrative embodiment graph schema missing entity detector 218 may be a separate component of data processing system 200. For example, graph schema missing entity detector 218 may be a hardware component coupled to communication fabric 202 or a combination of hardware and software components. In another alternative illustrative embodiment, a first portion of graph schema missing entity detector 218 may be located in data processing system 200 and a second portion of graph schema missing entity detector 218 may be located in a second data processing system, such as, for example, graph database server 106 in FIG. 1.

Graph schema missing entity detector 218 controls the process of assessing correctness of existing entities, which correspond to a particular domain, within a graph schema by detecting missing entity types in the graph schema and automatically adding the missing entity types to the graph schema to increase graph database query performance and efficiency. Graph database 220 represents a listing of a set of one or more domain knowledge graph databases residing in the graph database server. Graph database 220 contains information corresponding to a particular domain of knowledge.

Graph database 220 complies with graph schema 222. Graph schema 222 includes root entities 224 and entity types 226. Root entities 224 represent a set of one or more entities modeled in graph schema 222. Root entities 224 have no parent entities. In other words, root entities 224 represent root nodes in graph database 220. Entity types 226 represent a plurality of sub-entities that are in a child relationship with one or more of root entities 224. In other words, entity types 226 represent child nodes of parent nodes associated with root entities 224 in graph database 220.

Knowledge domain 228 represents a particular domain of knowledge stored in graph database 220. Knowledge domain 228 may represent any domain of knowledge. Data sources 230 represent a plurality of local and remote sources of information corresponding to the particular domain of knowledge represented by knowledge domain 228. Data sources 230 include unlabeled and unstructured data 232. However, it should be noted that data sources 230 also may include labeled and structured data in addition to unlabeled and unstructured data 232.

Graph schema missing entity detector 218 utilizes machine learning component 234 to analyze unlabeled and unstructured data 232. Graph schema missing entity detector 218 utilizes clustering algorithm 236 to partition unlabeled and unstructured data 232 into clusters 238 based on the analysis of unlabeled and unstructured data 232 by machine learning component 234. Clusters 238 are proportional to root entities 224. In addition, clustering algorithm 236 includes clustering initializing formula 240, which initializes one additional cluster, such as additional cluster 242.

If graph schema missing entity detector 218 detects that additional cluster 242 is populated with data points, then graph schema missing entity detector 218 determines that an entity type is missing from graph schema 222 and adds the missing entity type to graph schema 222. Afterward, graph schema missing entity detector 218 outputs updated graph schema 222 to the graph database server hosting graph database 220 for implementation.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 244 is located in a functional form on computer readable media 246 that is selectively removable and may be loaded onto or transferred to data processing system 200 for running by processor unit 204. Program code 244 and computer readable media 246 form computer program product 248. In one example, computer readable media 246 may be computer readable storage media 250 or computer readable signal media 252. Computer readable storage media 250 may include, for example, an optical or magnetic disc that is inserted or placed into a drive or other device that is part of persistent storage 208 for transfer onto a storage device, such as a hard drive, that is part of persistent storage 208. Computer readable storage media 250 also may take the form of a persistent storage, such as a hard drive, a thumb drive, or a flash memory that is connected to data processing system 200. In some instances, computer readable storage media 250 may not be removable from data processing system 200.

Alternatively, program code 244 may be transferred to data processing system 200 using computer readable signal media 252. Computer readable signal media 252 may be, for example, a propagated data signal containing program code 244. For example, computer readable signal media 252 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 244 may be downloaded over a network to persistent storage 208 from another device or data processing system through computer readable signal media 252 for use within data processing system 200. For instance, program code stored in a computer readable storage media in a data processing system may be downloaded over a network from the data processing system to data processing system 200. The data processing system providing program code 244 may be a server computer, a client computer, or some other device capable of storing and transmitting program code 244.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 246 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

A graph formalization (i.e., graph schema), such as, for example, a web ontology, is a description of entities that exist is a particular domain of knowledge and the relationships between the entities within that particular domain. A graph database is a collection of instance data that conforms to a set of one or more graph schemas. Entities within a graph schema may be either manually modeled by a subject matter expert of a particular domain or automatically modeled by a computer.

In cases where a graph database is utilized to store data, techniques for building out a graph schema for that graph database may feature an automated component. For example, a subject matter expert may manually build the graph schema and then the graph schema is supplemented through computer-automated techniques. In other cases, or in situations where noise is more readily tolerated, the entire schema may be developed through an automated approach. In either approach, it is important to assess the correctness of the entities that have been modeled in the schema and make suggestions for new entity types, where some entity types may have been missed. It also may be important to indicate where an entity may be over-generalized. In cases of entity over generalization, an over-generalized entity can be further specified and decomposed into multiple sub-entities (i.e., entity types) or sub-classes. In other situations, an entity may be over-specified and may need to be more generalized. Either error (i.e., over-generalized or under-specified) is possible, whether developing a graph schema manually or automatically, and should be corrected for a more efficient data model and an accurate reflection of the knowledge in that domain.

Illustrative embodiments automatically detect entity gaps within an existing graph schema for the purpose of adding new entity types to the existing graph schema and automatically assessing accuracy of existing entities in the graph schema. As an example scenario, in an oil and gas industry domain, a Reservoir entity may be characterized by frequent links to Depth and Porosity entities. The Depth entity may be characterized by having entity types, such as a True Vertical Depth entity type, a Mean Sea Level entity type, and a Median Sea Level entity type. It is the job of a graph database to hold instance data corresponding to that particular data model for that particular domain. The data conforming to that particular model may be logically represented as, for example:

alpha rdf:type Reservoir;
alpha has (3000 m rdf:type Mean Sea Level).

In this particular oil and gas industry domain example, a subject matter expert would be able to point to this data model and indicate that information is missing. In this example, the entity Reservoir is under-specified. For example, many types of Reservoirs, such as Carbonate Reservoirs, Sandstone Reservoirs, and the like, exist that should be modeled to effectively understand the relationship to the Depth entity. Similarly, the Depth entity is over-specified. While True Vertical Depth and Mean Sea Level are common depth designations, the entity specification in the graph schema of Median Sea Level may have been the result of an over-zealous subject matter expert in modeling the data. For example, the Median Sea Level entity type may have less relevance to the Depth entity.

However, current computer algorithms are not necessarily going to arrive at the same conclusion as a subject matter expert with respect to this data model. For example, this data model is both syntactically and semantically valid. In computational terms, this data model can be compiled and data can be associated with and retrieved from this data model.

Furthermore, a manual review of this data model by a subject matter expert may indicate that the Porosity entity is missing. The association of Depth entities to Reservoir entities is not incorrect, but this association will take on greater meaning during any analysis of this data model if the Porosity entity also is included. Finally, the subject matter expert also will likely assess accuracy of all entities in the graph schema. In this example, all entities are relevant, but relevance can be a subjective concern particularly in larger data models.

Illustrative embodiments detect and add new entity types to graph schemas through analysis of unlabeled and unstructured data of a particular domain using machine learning. By using a clustering algorithm, which is initiated with cluster centroids proportional to root entities of a particular domain in a graph schema, illustrative embodiments divide the unlabeled and unstructured data into Voronoi cells. The clustering algorithm may utilize a cluster initialization formula, such as, for example: a σ∝(ω+1) (i.e., the number of clustering centroids is proportional to the number of root entities plus one). Using the example above, illustrative embodiments assume that both Reservoir and Depth entities have already been modeled and that instance data for these entities exist. Illustrative embodiments initialize one additional cluster using the cluster initialization formula. In other words, the cluster initialization formula will always initialize the cluster centroids with one cluster more than entities that exist in the graph schema. If this one additional cluster is populated, it indicates that an entity type is missing from the graph schema. Using the above example, illustrative embodiments assume that the clustered data corresponding to the one additional cluster is indicative of the Porosity entity, which was not previously modeled. The data that was ingested by illustrative embodiments from the oil and gas industry domain contain multiple relationships from the Reservoir entity to the Porosity entity and from the Depth entity to the Porosity entity. Based on the results of the clustering algorithm, the Porosity entity is clearly a separate entity and one that has not been modeled in the existing graph schema.

Once illustrative embodiments detect the missing entity, illustrative embodiments execute the clustering algorithm once again. In other words, illustrative embodiments repeat the cluster initialization formula. This time, illustrative embodiments increment the number of existing entities within the graph schema by one (i.e., the Porosity entity has been added to the graph schema). Therefore, using the above example, illustrative embodiments will initialize the cluster centroids using a value of four. The initialization of four cluster centroids will result in the population of only three clusters, which indicates that no other missing entities exist in the graph schema.

However, it should be noted that the detection of missing entities depends upon the extent of the source domain data available. In other words, machine learning algorithms are dependent upon the amount of source data provided to them. While this may be taken as a limitation in some cases, it should be noted that in other cases it becomes a preferred approach. The entities modeled in a graph schema will never be greater than the source domain data behind the modeled entities.

Figure 3:
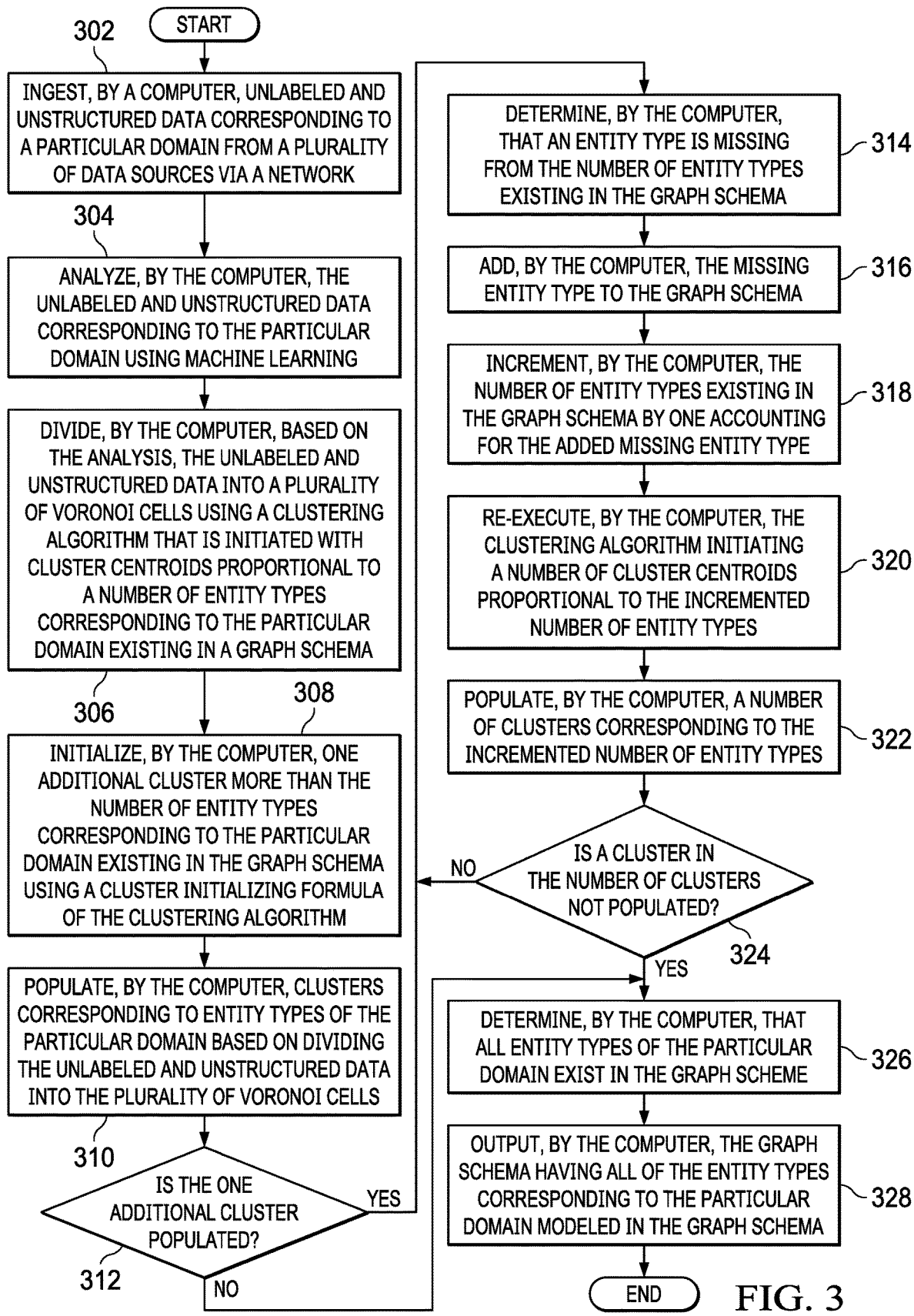
FIG. 3 is a flowchart illustrating a process for assessing correctness of entities corresponding to a particular domain existing in a graph schema by detecting missing entity types in the graph schema and automatically adding the detected missing entity types in accordance with an illustrative embodiment.

With reference now to FIG. 3, a flowchart illustrating a process for assessing correctness of entities corresponding to a particular domain existing in a graph schema by detecting missing entity types in the graph schema and automatically adding the detected missing entity types is shown in accordance with an illustrative embodiment. The process shown in FIG. 3 may be implemented in a computer, such as server 104 in FIG. 1 or data processing system 200 in FIG. 1.

The process begins when the computer ingests unlabeled and unstructured data corresponding to a particular domain from a plurality of data sources via a network (step 302). The computer analyzes the unlabeled and unstructured data corresponding to the particular domain using machine learning (step 304). Based on the analysis, the computer divides the unlabeled and unstructured data into a plurality of Voronoi cells using a clustering algorithm that is initiated with cluster centroids proportional to a number of entity types corresponding to the particular domain existing in a graph schema (step 306). The clustering algorithm may be, for example, a k-means clustering algorithm. However, alternative illustrative embodiments are not limited to such. In other words, different illustrative embodiments may utilize one or more different types of clustering algorithms. For example, alternative illustrative embodiments may utilize mean-shift clustering, density-based spatial clustering, expectation-maximization clustering using Gaussian Mixture Models, hierarchical clustering, or the like.

Further, the computer initializes one additional cluster more than the number of entity types corresponding to the particular domain existing in the graph schema using a cluster initializing formula of the clustering algorithm (step 308). The clustering initializing formula may be, for example, σ∝(ω+1), where a is equal to a number of clustering centroids and co is equal to a number of root entities in a graph schema. In other words, the number of clustering centroids is proportional to the number of root entities plus one. A root entity is an entity that has no parent entity. An entity type is a sub-entity that is in a child relationship to a root entity.

Furthermore, the computer populates clusters corresponding to entity types of the particular domain based on dividing the unlabeled and unstructured data into the plurality of Voronoi cells (step 310). Afterward, the computer makes a determination as to whether the one additional cluster is populated (step 312). If the computer determines that the one additional cluster is not populated, no output of step 312, then the process proceeds to step 326. If the computer determines that the one additional cluster is populated, yes output of step 312, then the computer determines that an entity type is missing from the number of entity types existing in the graph schema (step 314).

The computer adds the missing entity type to the graph schema (step 316). By adding the missing entity type to the graph schema, the computer transforms the graph schema into a new and modified graph schema. In an alternative illustrative embodiment, instead of, or in addition to, adding the missing entity type to the graph schema, the computer generates and sends a notification to a user, such as a database administrator, regarding the missing entity type for review and possible action.

After adding the missing entity type to the graph schema in step 316, the computer increments the number of entity types existing in the graph schema by one accounting for the added missing entity type (step 318). Then, the computer re-executes the clustering algorithm initiating a number of cluster centroids proportional to the incremented number of entity types (step 320).

The computer populates a number of clusters corresponding to the incremented number of entity types (step 322). Afterward, the computer makes a determination as to whether a cluster in the number of clusters is not populated (step 324). If the computer determines that the number of clusters is populated, no output of step 324, then the process returns to step 314 where the computer determines that another entity type is missing. If the computer determines that a cluster in the number of clusters is not populated, yes output of step 324, then the computer determines that all entity types of the particular domain exist in the graph schema (step 326). Subsequently, the computer outputs the graph schema having all of the entity types corresponding to the particular domain modeled in the graph schema (step 328). The computer outputs the graph schema to a graph database server, such as graph database server 106 in FIG. 1, to implement the graph database for that particular domain and increase query performance of that particular graph database server. In addition, the computer may output the graph schema to a graph database administrator for review. Thereafter, the process terminates.

Thus, illustrative embodiments of the present invention provide a computer-implemented method, computer system, and computer program product for assessing correctness of entities corresponding to a particular domain existing in a graph schema by detecting missing entity types in the graph schema and automatically adding the detected missing entity types to the graph schema. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for detecting missing entities in a graph schema, the computer-implemented method comprising:
    dividing unlabeled and unstructured data of a particular domain into a plurality of Voronoi cells using a clustering algorithm that is initiated with cluster centroids proportional to a number of entities corresponding to the particular domain existing in the graph schema;
    initializing one additional cluster more than the number of entities corresponding to the particular domain existing in the graph schema using a cluster initializing formula of the clustering algorithm;
    populating clusters corresponding to entities of the particular domain based on dividing the unlabeled and unstructured data into the plurality of Voronoi cells;
    determining whether the one additional cluster is populated;
    responsive to determining that the one additional cluster is populated, determining that an entity is missing from the number of entities existing in the graph schema and adding the missing entity to the graph schema; and
    responsive to determining that the one additional cluster is not populated, determining that all entities of the particular domain exist in the graph schema.

2. The computer-implemented method of claim 1 further comprising:
    populating a number of clusters corresponding to the incremented number of entities;
    determining whether a cluster in the number of clusters is not populated;
    responsive to determining that the number of clusters is populated, determining that another entity is missing from the graph schema; and
    responsive to determining that a cluster in the number of clusters is not populated, determining that all entities of the particular domain exist in the graph schema.

3. The computer-implemented method of claim 1 further comprising:
    sending a notification regarding the missing entity in the graph schema; and
    outputting the graph schema having all entities corresponding to the particular domain modeled in the graph schema.

4. The computer-implemented method of claim 3, wherein the graph schema having all of the entities corresponding to the particular domain modeled in the graph schema is outputted to a graph database server hosting a graph database that complies with the graph schema to increase query performance and efficiency of the graph database server.

5. The computer-implemented method of claim 1 further comprising:
    ingesting the unlabeled and unstructured data corresponding to the particular domain from a plurality of data sources via a network; and
    analyzing the unlabeled and unstructured data corresponding to the particular domain using machine learning.

6. The computer-implemented method of claim 1, wherein the clustering algorithm is a k-means clustering algorithm.

7. The computer-implemented method of claim 1, wherein the clustering initializing formula defines that a number of clustering centroids is proportional to a number of root entities plus one.

8. A computer system for detecting missing entities in a graph schema, the computer system comprising:
    a bus system;
    a storage device connected to the bus system, wherein the storage device stores program instructions; and
    a processor connected to the bus system, wherein the processor executes the program instructions to:
    divide unlabeled and unstructured data of a particular domain into a plurality of Voronoi cells using a clustering algorithm that is initiated with cluster centroids proportional to a number of entities corresponding to the particular domain existing in the graph schema;
    initialize one additional cluster more than the number of entities corresponding to the particular domain existing in the graph schema using a cluster initializing formula of the clustering algorithm;
    populate clusters corresponding to entities of the particular domain based on dividing the unlabeled and unstructured data into the plurality of Voronoi cells;
    determine whether the one additional cluster is populated;
    determine that an entity is missing from the number of entities existing in the graph schema and add the missing entity type to the graph schema in response to determining that the one additional cluster is populated; and
    determine that all entities of the particular domain exist in the graph schema in response to determining that the one additional cluster is not populated.

9. The computer system of claim 8, wherein the processor further executes the program instructions to:
    populate a number of clusters corresponding to the incremented number of entities;
    determine whether a cluster in the number of clusters is not populated;
    determine that another entity is missing from the graph schema in response to determining that the number of clusters is populated; and
    determine that all entities of the particular domain exist in the graph schema in response to determining that a cluster in the number of clusters is not populated.

10. The computer system of claim 8, wherein the processor further executes the program instructions to:
    send a notification regarding the missing entity in the graph schema; and
    output the graph schema having all entities corresponding to the particular domain modeled in the graph schema.

11. The computer system of claim 10, wherein the graph schema having all of the entities corresponding to the particular domain modeled in the graph schema is outputted to a graph database server hosting a graph database that complies with the graph schema to increase query performance and efficiency of the graph database server.

12. The computer system of claim 8, wherein the processor further executes the program instructions to:
  ingest the unlabeled and unstructured data corresponding to the particular domain from a plurality of data sources via a network; and
  analyze the unlabeled and unstructured data corresponding to the particular domain using machine learning.

13. A computer program product for detecting missing entities in a graph schema, the computer program product comprising a computer readable storage medium having program instructions embodied therewith, the program instructions executable by a computer to cause the computer to perform a method comprising:
  dividing unlabeled and unstructured data of a particular domain into a plurality of Voronoi cells using a clustering algorithm that is initiated with cluster centroids proportional to a number of entities corresponding to the particular domain existing in the graph schema;
  initializing one additional cluster more than the number of entities corresponding to the particular domain existing in the graph schema using a cluster initializing formula of the clustering algorithm;
  populating clusters corresponding to entities of the particular domain based on dividing the unlabeled and unstructured data into the plurality of Voronoi cells;
  determining whether the one additional cluster is populated;
  responsive to determining that the one additional cluster is populated, determining that an entity is missing from the number of entities existing in the graph schema and sending a notification regarding the missing entity type; and
  responsive to determining that the one additional cluster is not populated, determining that all entities of the particular domain exist in the graph schema.

14. The computer program product of claim 13 further comprising:
  populating a number of clusters corresponding to the incremented number of entities;
  determining whether a cluster in the number of clusters is not populated;
  responsive to determining that the number of clusters is populated, determining that another entity is missing from the graph schema; and
  responsive to determining that a cluster in the number of clusters is not populated, determining that all entities of the particular domain exist in the graph schema.

15. The computer program product of claim 13 further comprising:
  adding the missing entity to the graph schema; and
  outputting the graph schema having all entities corresponding to the particular domain modeled in the graph schema.

16. The computer program product of claim 15, wherein the graph schema having all of the entities corresponding to the particular domain modeled in the graph schema is outputted to a graph database server hosting a graph database that complies with the graph schema to increase query performance and efficiency of the graph database server.

17. The computer program product of claim 13 further comprising:
  ingesting the unlabeled and unstructured data corresponding to the particular domain from a plurality of data sources via a network; and
  analyzing the unlabeled and unstructured data corresponding to the particular domain using machine learning.

18. The computer program product of claim 13, wherein the clustering algorithm is a k-means clustering algorithm.

19. The computer program product of claim 13, wherein the clustering initializing formula defines that a number of clustering centroids is proportional to a number of root entities plus one.

* * * * *